(12) United States Patent
Ramasamy et al.

(10) Patent No.: US 7,710,959 B2
(45) Date of Patent: May 4, 2010

(54) PRIVATE VLAN EDGE ACROSS MULTIPLE SWITCH MODULES

(75) Inventors: Kailasapathi Ramasamy, San Jose, CA (US); Jungfu Tsao, San Jose, CA (US); Somnath Mitra, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

(21) Appl. No.: 11/468,219

(22) Filed: Aug. 29, 2006

(65) Prior Publication Data
US 2008/0056260 A1 Mar. 6, 2008

(51) Int. Cl.
*H04L 12/56* (2006.01)
*H04L 12/28* (2006.01)
*H04J 3/24* (2006.01)

(52) U.S. Cl. ...................................... 370/389; 370/474
(58) Field of Classification Search ................. 370/254, 370/389, 392, 395.53, 338, 401, 409, 474, 370/464, 471, 428, 429, 230, 235
See application file for complete search history.

(56) References Cited

U.S. PATENT DOCUMENTS

| | | | |
|---|---|---|---|
| 4,446,555 A | 5/1984 | Devault et al. | |
| 4,456,957 A | 6/1984 | Schieltz | |
| 4,506,358 A | 3/1985 | Montgomery | |
| 4,646,287 A | 2/1987 | Larson et al. | |
| 4,769,810 A | 9/1988 | Eckberg, Jr. et al. | |
| 4,769,811 A | 9/1988 | Eckberg, Jr. et al. | |
| 4,893,306 A | 1/1990 | Chao et al. | |
| 4,922,486 A | 5/1990 | Lidinsky et al. | |
| 4,962,497 A | 10/1990 | Ferenc et al. | |
| 5,088,032 A | 2/1992 | Bosack | |
| 5,095,480 A | 3/1992 | Fenner | |
| 5,136,580 A | 8/1992 | Videlock et al. | |
| 5,202,899 A | 4/1993 | Walsh | |
| 5,212,686 A | 5/1993 | Joy et al. | |
| 5,237,564 A | 8/1993 | Lespagnol et al. | |
| 5,241,682 A | 8/1993 | Bryant et al. | |
| 6,975,627 B1 * | 12/2005 | Parry et al. ................. | 370/389 |
| 7,095,741 B1 | 8/2006 | Joshi et al. | |
| 2004/0047353 A1 * | 3/2004 | Umayabashi et al. .. | 370/395.63 |
| 2005/0175018 A1 * | 8/2005 | Wong ......................... | 370/396 |

FOREIGN PATENT DOCUMENTS

WO 9520850 8/1995

OTHER PUBLICATIONS

Awduche et al., "Requirements for Traffic Engineering Over MPLS" RFC 2707, Sep. 1999, 29 pgs.
Prosecution History for U.S. Patent 7,095,741, filed Dec. 20, 2000, Joshi et al.

* cited by examiner

*Primary Examiner*—Chirag G Shah
*Assistant Examiner*—Amarnauth Persaud
(74) *Attorney, Agent, or Firm*—Stolowitz Ford Cowger LLP (57) ABSTRACT

A source endpoint connected via a Virtual Local Area Network to a first access port and a destination endpoint connected to a second access port. Two or more network processing devices indirectly connected through a backplane interconnect to transmit data between the source and destination endpoints according to a protected port status of the first and second access ports.

33 Claims, 4 Drawing Sheets

| SOURCE PORT 515 | DESTINATION PORT 525 | FORWARD? |
|---|---|---|
| PROTECTED | PROTECTED | NO |
| PROTECTED | NON- PROTECTED | YES |
| NON- PROTECTED | PROTECTED | YES |
| NON- PROTECTED | NON- PROTECTED | YES |

PRIVATE VLAN EDGE ACROSS MULTIPLE SWITCH MODULES

BACKGROUND

The invention relates to an apparatus, system and method to implement a protected port feature in a network, such as a Virtual Local Area Network (VLAN). The protected port feature may be referred to as Private VLAN Edge.

A protected port feature may be desirable in a network in which the transmission of information to and between endpoints needs to be controlled. In certain situations, it is preferable that some endpoints receive more or less information than others. Similarly, it may be desirable to limit or restrict the flow of information to one or more endpoints. The protected port feature identifies ports as being either protected or unprotected and thereby determines how data is transmitted to or between these ports.

The protected port feature may be supported in a Local Area Network (LAN) that includes a conventional switch. The endpoints are connected to each other through the local, common switch. The switch is able to control the transmission of data transmitted to endpoints connected to its local ports. A LAN or VLAN that includes two or more conventional switches does not support the protected port feature.

The invention will become more readily apparent from the following detailed description of a preferred embodiment of the invention which proceeds with reference to the accompanying drawings.

DETAILED DESCRIPTION OF EXAMPLE EMBODIMENTS

A Virtual Local Area Network (VLAN) is a network that is configured to associate multiple end users situated in one or more local area networks irrespective of their physical location. For example, two or more VLAN may be configured to share at least some common endpoints, servers and switches that may reside in one or more physical locations. In this manner, a single endpoint may belong to one or more VLAN. Configuring a VLAN can accomplish a number of objectives, including: intelligent management of broadcast services; isolating ports, or end-users, connected from one VLAN from data transmitted in a second VLAN; and resource sharing, among others.

Figure 1:
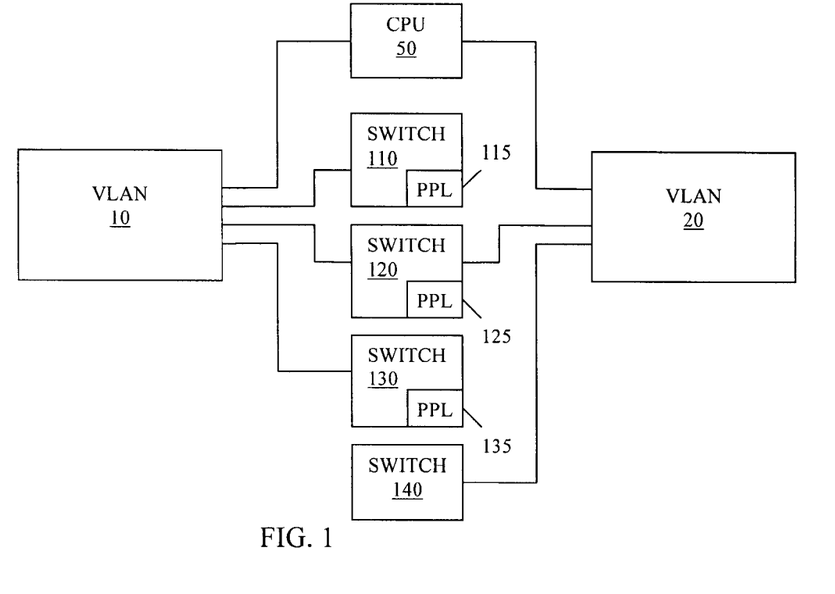
FIG. 1 illustrates an example block diagram of two Virtual Local Area Networks (VLANs) including switches having protected port logic.

FIG. 1 shows a block diagram of two VLAN connecting multiple switches. A VLAN 10 is configured to include a central processing unit (CPU) 50, a first switch 110, a second switch 120 and a third switch 130. A second VLAN 20 is configured to include the CPU 50, the second switch 120 and a fourth switch 140. It can be seen from this example that both VLAN 10 and 20 are configured to include the CPU 50 and switch 120. The first switch 110 may therefore be isolated from data transmitted on VLAN 20, and the fourth switch 140 may be isolated from data transmitted on VLAN 10. The switches shown in FIG. 1 may each be implemented using different switch ASIC (Application Specific Integrated Circuit), including switches developed by different vendors. Network processing devices, such as switches, routers, and bridges, may be configured to select a path or circuit for sending data to its destination. A network processing device may also determine a route, or transmission path, for data in some applications.

The VLANs 10 and 20 may be configured to include any endpoints, or work stations, that are identified according to a department or work group. For example VLAN 10 may include endpoints that are identified as part of an Engineering department, whereas the second VLAN 20 may include endpoints that are identified as part of a Purchasing department. Endpoints can also be configured into both VLAN 10 and VLAN 20 and may therefore view and share information with other endpoints in the Engineering department, the Purchasing department, or both. For example, an endpoint connected to the switch 120 may communicate with other endpoints associated with VLAN 10 or VLAN 20. Endpoints that are associated with only one VLAN may only be able to view and share information with one department. For example, an endpoint connected to the switch 130 may not be able to communicate with other endpoints associated with VLAN 20.

Switches 110, 120 and 130 may include processors, logic, or circuitry that operate on or provide a processing capability of data transmitted from the endpoints. For example, switch 110 may include protected port logic (PPL) 1115, switch 120 may include a PPL 125, and switch 130 may include a PPL 135. VLAN 110 is shown as including switches which all include protected port logic, whereas VLAN 120 is shown as including switch 140 that does not include protected port logic, as well as switch 120 that does include protected port logic PPL 125. Protected port logic may be provided by a central processing unit (CPU) 50 or some other processor, server or protected port logic device in the VLAN, rather than by each switch.

Figure 2:
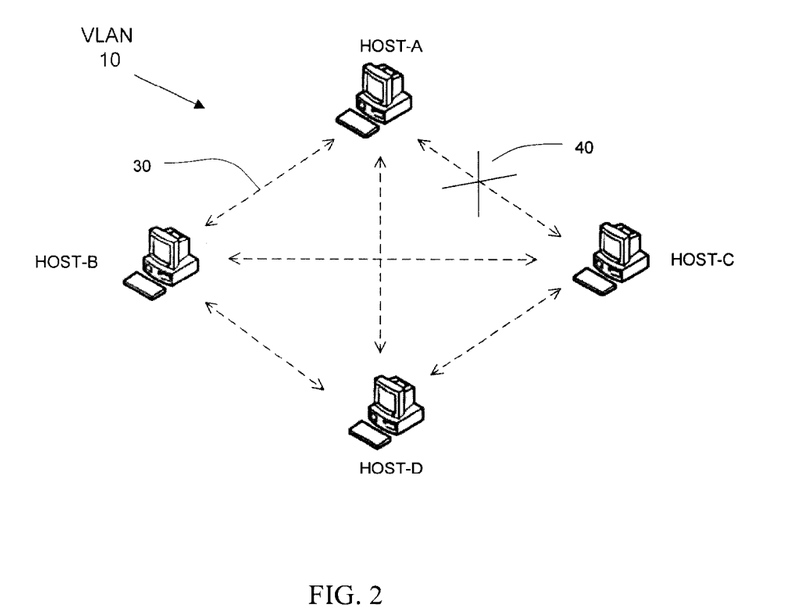
FIG. 2 illustrates example data transmission paths between endpoints in one of the VLANs shown in FIG. 1.

FIG. 2 illustrates example data transmission paths between endpoints Host A, Host B. Host C and Host D in VLAN 10. The endpoints may be computers, terminals, servers, network devices or end users, for example. Endpoints may indicate a specific location or address for accessing a service using a protocol and data format. The endpoints are shown as being indirectly connected to each other in the VLAN 10. A transmission protocol may be configured to provide transmission paths, such as transmission path 30, which allow data to be transmitted in either direction as between some of the two endpoints, such as endpoints Host A and Host B. Transmission path 40 between Host A and Host C is shown with an "X" to signify that data transmitted between these two endpoints may be dropped before reaching a destination. The transmission protocol may allow data to be forwarded between some of the endpoints, such as Host A and Host C, whereas data is dropped between other endpoints, such as Host A and Host C.

Figure 3:
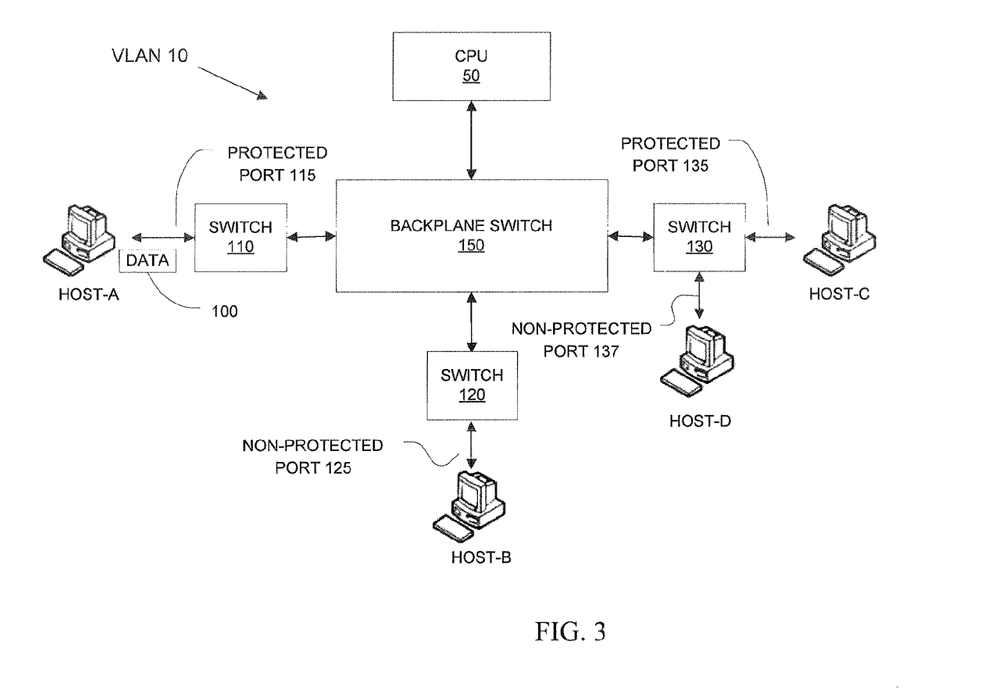
FIG. 3 illustrates an example block diagram of the VLAN of FIG. 2 including a backplane switch and the endpoints connected to protected and unprotected ports.

FIG. 3 illustrates an example block diagram of the VLAN 10 of FIG. 2 including a backplane switch 150, CPU 50 and switches 110, 120 and 130. Switches 110, 120 and 130 are shown indirectly coupled to each other through the backplane switch 150. Backplane switch 150 may be a backplane interconnect such as a backplane Ethernet switch. Switch 110 is shown connected to an endpoint (Host A) through a protected port 115, and switch 120 is shown connected to an endpoint (Host B) through a non-protected port 125. Switch 130 is connected to an endpoint (Host C) through a protected port 135, and is also connected to a further endpoint (Host D) through a non-protected port 137. CPU 50 in VLAN 10 may be connected directly or through an Ethernet switch (not shown) to the backplane switch 150. CPU 50 may be a server, shared database or other type of processor.

Any of Host A, Host B, Host C or Host D may be a source endpoint or a destination endpoint of a data transmission, such as data packet 100, sent on VLAN 10. For example, Host A may be a source endpoint for the data packet 100 sent to Host B. Host B may be a source endpoint for a broadcast data transmission sent to all the other endpoints in VLAN 10 that includes Host A, Host C and Host D. Data packet 100 is generally understood to include any type of data (voice, video, etc), and may be included in an Ethernet frame, for example, transmitted between two or more endpoints. As used herein, a transmission of the data packet includes a transmission of an Ethernet frame, token ring frame, or other network frame which may include data and identification fields.

A protected port status of the ports 115, 125, 135 and 137 may be used to determine a transmission protocol between endpoints. The transmission protocol may be used to isolate one or more access ports from data transmitted by a source endpoint. Port isolation, or private VLAN edge, may be accomplished transparent to the backplane switch 150, as will be discussed further. A protected port may identify an associated endpoint that will not receive certain data transmissions on a particular VLAN. A non-protected port may identify an associated endpoint that will generally receive all of the information that is broadcast on a particular VLAN, as well as receive any data from a source endpoint that identifies the associated endpoint as a destination endpoint.

In one embodiment, the protected port feature may be supported by means of connecting two or more switches, such as switches 110 and 120, in a stacked connection and providing a vendor specific tag that is carried from one switch to the other. The vendor specific tag is used by the switches to determine a transmission protocol that is to be applied to the data. Switches provided in the stacked connection may include the same switch ASIC.

Figure 4:
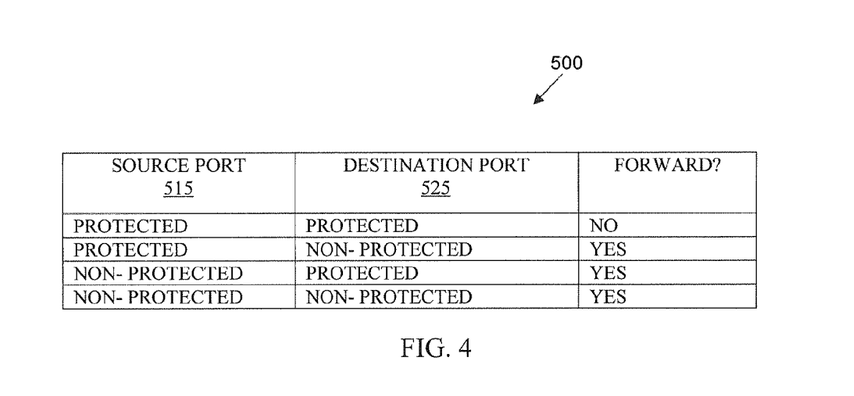
FIG. 4 illustrates a table showing an example transmission protocol based on the protected status of source and destination ports.

FIG. 4 illustrates a table 500 showing an example transmission protocol based on a protected status of a source port 515 and a destination port 525. The transmission protocol may be configured to determine whether or not to forward a data packet sent from the source port 515 to the destination port 525. According to FIG. 4, data transmitted from a protected source port to a protected destination port is not forwarded. Data transmitted from a protected source port to a non-protected destination port is forwarded. Data transmitted from a non-protected source port to a protected destination port is forwarded. Data transmitted from a non-protected source port to a non-protected destination port is forwarded.

Therefore, according to FIG. 4, a data packet is forwarded to the destination port 525 for all combinations of protected port status except where the source port 515 and the destination port 525 are both identified as being protected. Of course, different transmission protocols are contemplated and claimed herein, including logic that forwards or drops data transmission according to different combinations of protected port status. For example, an alternative transmission protocol may drop all data packets that are sent to a destination port that is identified as protected, irrespective of the protected port status of the source port.

The transmission protocol may be carried out or processed within one or more of the switches 110, 120 and 130, the CPU 50, or any other processor or server associated with the network. A data transmission from a first switch associated with a first access port may be sent to a second switch associated with a second access port. The second switch may compare a protected port status of the first and second access ports to determine if the data transmission should be forwarded to a destination endpoint or dropped. A data transmission broadcast to all of the endpoints in a VLAN may be processed by each of the switches to determine a port comparison separately from the other switches.

Figure 5:
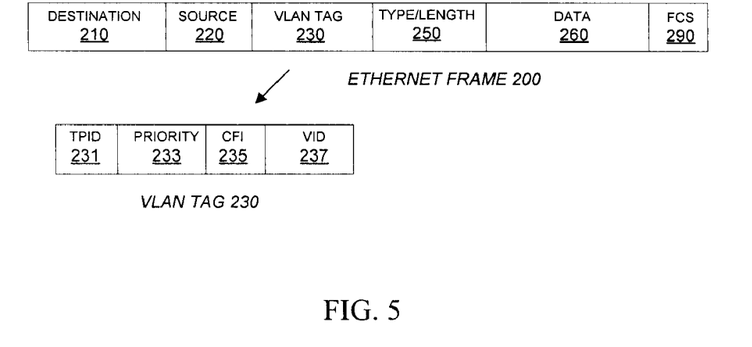
FIG. 5 illustrates an example pictorial representation of an Ethernet frame including a data packet and a VLAN tag.

FIG. 5 illustrates an example pictorial representation of an Ethernet frame 200 including data 260 that may be transmitted in a VLAN. Ethernet frame 200 has a data header that includes a destination address field 210, a source address field 220, a VLAN tag 230 and a type/length field 250. The destination address 210 identifies a destination endpoint and may include a layer-two address, such as a Media Access Control (MAC) address, of the destination endpoint. Layer-two may be specified with reference to the Institute of Electrical and Electronic Engineers (IEEE) industry standard IEEE 802.3. The source field 220 identifies a source endpoint and may include a MAC address of the source endpoint. The data packet 100 described with reference to FIG. 3, may be transported in the Ethernet frame 200 and include data 260 and one or more other fields of Ethernet frame 200.

The VLAN tag 230 of FIG. 5 includes fields for Tag Protocol Identifier (TPID), priority, Canonical Format Indicator (CFI) and VLAN Identifier (VID). A TPID field 231 may identify Ethernet frame 200 according to the Institute of Electrical and Electronic Engineers (IEEE) industry standard IEEE 802.1Q, for example, and in one application is set to a value of 0×8100. A priority field 233 represents a priority of Ethernet frame 200, and may be set according to a priority identified by the industry standard IEEE 802.1p. A CFI field 235 is used for layer-three services or applications, and is not used or required for conventional layer-two services or applications, in which case it may be set to zero. A VID field 237 may be used to identify a VLAN associated with Ethernet frame 200.

Ethernet frame 200 of FIG. 4 also includes a Frame Check Sequence (FCS) field 290. The FCS field 290 may be used to validate or ensure a data transmission was completed without any data loss.

Ethernet frame 200 may be sent from a first endpoint, such as Host A of FIG. 2, over a first port, such as protected port 115, to a first switch, such as switch 110. The first switch 110 modifies Ethernet frame 200 shown in FIG. 4 to include layer-two information (LFI) that is used in the protected port transmission protocol. Certain fields in Ethernet frame 200 may be modified, in addition to adding the layer-two information, and this is discussed in more detail below.

Figure 6:
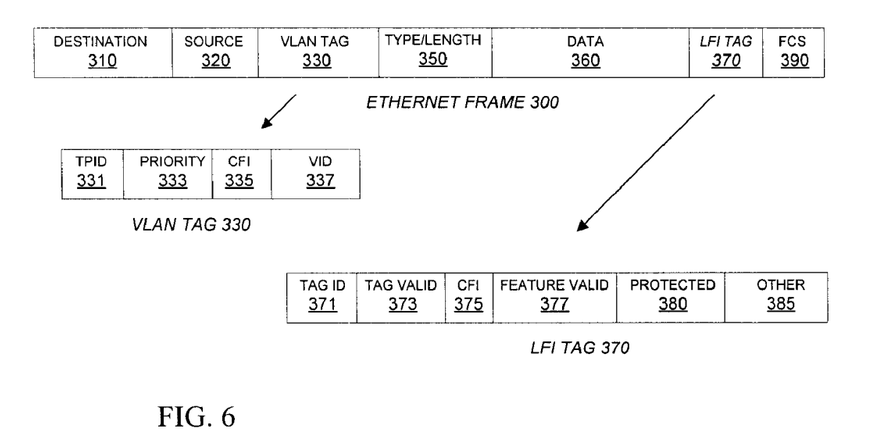
FIG. 6 illustrates an example pictorial representation of an Ethernet frame including the data packet of FIG. 5 and a Layer-two Feature Information (LFI) tag.

FIG. 6 illustrates an example pictorial representation of an Ethernet frame 300 having an LFI tag 370 including the layer-two information added by the first switch 110. Ethernet frame 300 may be transmitted from the first switch 110 to one or both switches 120 and 130 shown in FIG. 3. Data 360 of Ethernet frame 300 may contain the same data as data 260 included in Ethernet frame 200. Similarly, destination address field 310, source field 320, and FCS field 390 of Ethernet frame 300 may include the same information as the destination address field 210, the source field 220, and the FCS field 290, respectively, of Ethernet frame 200. The data packet 100 described with reference to FIG. 3, may be transported in the Ethernet frame 300 and include the data 360 and one or more other fields of Ethernet frame 300.

A transient CFI field 335 in Ethernet frame 300 corresponds to the original CFI field 235 of Ethernet frame 200. Transient CFI field 335 may be modified from original CFI field 235 to include a feature information tag, or data link tag. The feature information tag status is identified as valid when the LFI tag 370 is inserted into Ethernet frame 300 by a switch or other device. For example, a bit in the transient CFI field 335 may be set to on to indicate when the feature information tag is valid. As used herein, a bit in any of the fields described hereafter may be set to on, or true, to indicate a valid value, whereas a bit may be set to off, or false, to indicate an invalid value.

The LFI tag 370 of Ethernet frame 300 includes a Tag ID field 371, which may provide an identification or ownership of the LFI tag 370. For example, the Tag ID field 371 may include an Internet Assigned Numbers Authority (IANA) Enterprise Number, or identify a transmission protocol or switch that is compatible with the LFI tag 370. A tag valid field 373 and a feature valid field 377 in the LFI tag 370 may be used to indicate information that is contained in Ethernet frame 300, including other fields in the LFI tag 370 discussed herein. The legacy CFI field 375 in the LFI tag 370 may be used to store a legacy CFI value read from the original CFI field 235 of Ethernet frame 200. A protected port field 380 may be used to indicate the protected port status of a port associated with a switch, such as protected port 115 and the first switch 110. The other field 385 may include additional information that may be used for other transportation protocols or Ethernet frame identifications. In one embodiment (not shown), the LFI tag 370 is included at or near the beginning of the Ethernet frame 300, or before the data 360.

Figure 7:
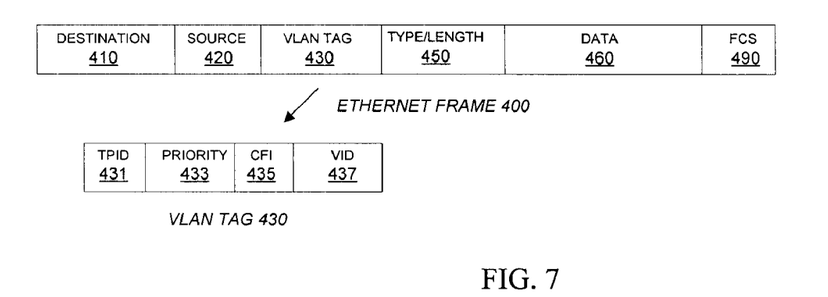
FIG. 7 illustrates an example pictorial representation of an Ethernet frame without the LFI tag shown in FIG. 6.

FIG. 7 illustrates an example pictorial representation of a further modified Ethernet frame 400 without the LFI tag 370. Data 460 in Ethernet frame 400 may include the same data as data 360 included in Ethernet frame 300 and data 260 included in Ethernet frame 200. Similarly, destination address field 410, source field 420, and FCS field 490 of Ethernet frame 400 may include the same information as the destination address fields 210 and 310, the source fields 220 and 320, and the FCS fields 290 and 390, respectively, of Ethernet frames 200 and 300. The data packet 100 described with reference to FIG. 3, may be transported in the Ethernet frame 400 and include the data 460 and one or more other fields of Ethernet frame 400.

A switch associated with the destination endpoint may remove the LFI tag 370 from Ethernet frame 300 to provide Ethernet frame 400 which is then forwarded to the destination endpoint. For example, switch 120 may receive Ethernet frame 300 from switch 110, remove the LFI tag 370, and transmit Ethernet frame 400 to the destination endpoint, such as Host B. Ethernet frame 400 may therefore include the same data and fields as Ethernet frame 200 shown in FIG. 5, such that the format of Ethernet frame 200 modified by switch 110 is restored by switch 120 in Ethernet frame 400. In this manner, data packet 100 may also be transmitted between switches 110 and 120.

Figure 8:
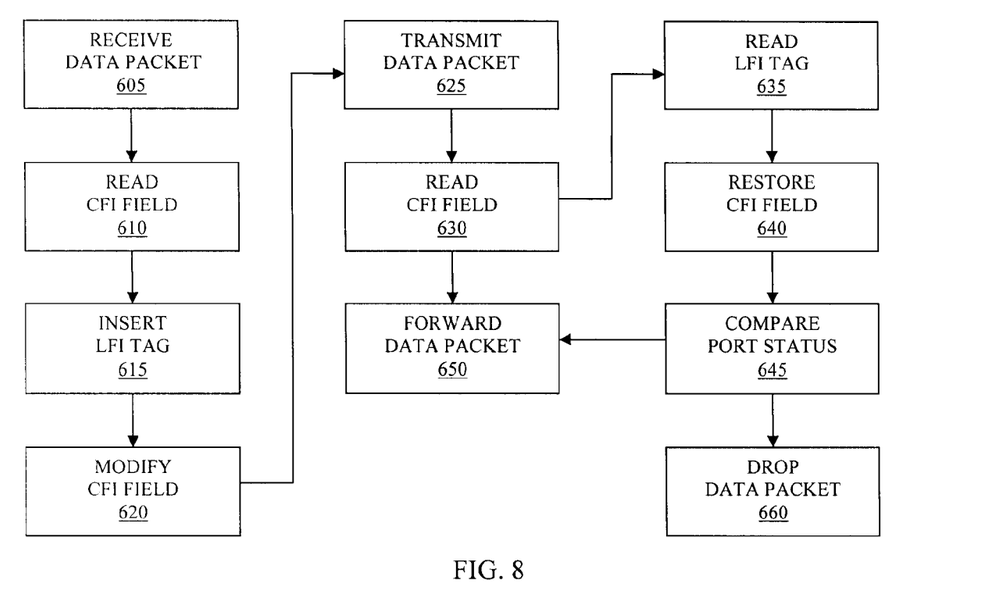
FIG. 8 illustrates an example flow chart including a method of transmitting the data packet over the VLAN of FIG. 3.

FIG. 8 illustrates an example flow chart of a method for transmitting data over the VLAN. As previously mentioned, data may be transmitted between multiple switches independently interconnected over a backplane switch. The data transmission of a data packet is herein described making reference to the flow chart illustrated in FIG. 8, and the example VLAN 10 shown in FIG. 3

At operation 605, a first switch such as switch 110 receives Ethernet frame 200 shown in FIG. 5, including the VLAN tag 230, over a port such as the protected port 115. The VLAN tag 230 may be formatted according to an industry standard IEEE 802.1Q. At operation 610, switch 110 reads the original CFI field 235 in the VLAN tag 230 to obtain a legacy CFI value.

At operation 615, a first switch such as switch 110 inserts the LFI tag 370 to create Ethernet frame 300 shown in FIG. 6. The LFI tag 370 may be referred to as a feature information tag, or a data link tag. The LFI tag 370 includes a legacy CFI field 375 which may store the legacy CFI value that is read from the original CFI field 235 of Ethernet frame 200. The LFI tag 370 also includes the protected port field 380, which specifies a port attribute. The protected port field 380 may include the protected port status of the port associated with switch 110. In this example, protected port field 380 would indicate a protected port status as being valid for the protected port 115. If the port associated with the first switch 110 is not protected, then the protected port field 380 would indicate a value of invalid, or non-protected status.

At operation 620, the transient CFI field 335 of Ethernet frame 300 is modified to include a feature information tag status. The feature information tag status is set to valid to indicate that the LFI tag has been inserted by a switch, such as switch 110.

At operation 625, a first switch such as switch 110 transmits Ethernet frame 300 across a backplane switch, such as backplane switch 150, to one or more switches, such as switch 120 or switch 130 in FIG. 3. As previously indicated, the data packet 100 may be transmitted to a single destination endpoint or broadcast to multiple endpoints in a VLAN. Fields located in the LFI tag 370 are transparent to the backplane switch 150.

At operation 630, a second switch such as switch 120 receives Ethernet frame 300. Switch 120 reads the transient CFI field 335 in Ethernet frame 300 to determine if the feature information tag status is valid. The feature information tag status is valid if the LFI tag 370 was inserted by switch 110. If the feature information tag status is valid, then switch 120 proceeds to operation 635. If the feature information tag status is invalid, then the second switch proceeds to operation 650 and forwards the data packet 100 without further processing. In one embodiment, switch 120 may remove the LFI tag 370 when the transient CFI field 335 includes an invalid feature information tag status.

If switch 120 receives Ethernet frame 200 instead of Ethernet frame 300, it may read the original CFI field 235. Typically, the original CFI field 235 is not used in layer-two data transmissions, and the associate bit is set to off, for example. In one embodiment, switch 120 is able to interpret the value in the original CFI field 235 of an Ethernet frame 200 as providing an invalid feature information tag status when the LFI tag 370 is not present, and therefore proceed to operation 650 and forward the data packet 100 without further processing.

Data packets sent from a protected port and a non-protected port may each include the L FI tag 370. If a bit in the original CFI field 235 is set, then switch 120 may determine to forward the data packet 100 without further processing if the LFI tag 370 is not detected, or if the bit is not set in the feature valid field 377. Further processing of the Ethernet frame 300, including a valid bit in the transient CFI field 335 and the LFI tag 370, may be performed by switch 120.

At operation 635, a second switch such as switch 120 reads the LFI tag 370 including the legacy CFI field 375. Switch 120 may therefore read the legacy CFI value from the legacy CFI field 375. In addition switch 120 may read the tag ID field 371, tag valid field 373, feature valid field 377, protected port field 380 and the other field 385.

In one embodiment, such as in a backplane switching environment, an LFI tag such as LFI tag 370 is added to any Ethernet frame having a CFI bit set, for example, in CFI field 235 or CFI field 335 of FIGS. 5 and 6, respectively. Switch 120 may assume that when a CFI bit is set in CFI field 235 or CFI field 335, that the LFI tag 370 has been inserted into the Ethernet frame 200 or Ethernet frame 300, respectively. If the Ethernet frame 200 comes to switch 120 with the CFI bit set in the CFI field 235, the LFI tag 370 may not include any feature information, in which case the bit in the feature valid field 377 in LFI tag 370 would not be set. In the case of receiving the Ethernet frame 200 without the bit in the feature valid field 377 being set, the switch 120 may proceed to operation 650 and forward the data packet 100 without further processing. Ethernet frames 200 and 300, both including a valid CFI bit and LFI tag 370, may therefore be processed according to the value included in the feature valid field 377.

At operation 640, a second switch such as switch 120 modifies the transient CFI field 335 in Ethernet frame 300 to restore the legacy CFI value included in the original CFI field 225.

At operation 645, a second switch such as switch 120 analyzes the information stored in the LFI tag 370. Switch 120 may analyze the data contained in the tag ID field 371 and the feature valid field 377, for example, to determine a transmission protocol. Switch 120 may analyze the data contained in the protected port field 380 to compare the protected port status of a sending port, such as port 115 and a destination port, such as port 125. Switch 120 may then decide to forward or drop the data packet 100 according to the port comparison. Switch 120 may refer to a table such as table 500 shown in FIG. 4 to decide a transmission protocol. In the present example, the sending or source port 515 is identified as protected port 115, and the receiving or destination port 525 is identified as non-protected port 125. According to table 500, a data packet transmitted between a protected source port 515 and a non-protected destination port is forwarded to the destination endpoint.

At operation 650, a second switch such as switch 120 forwards the data packet 100 to a destination endpoint. Before the data packet 100 is forwarded to the destination endpoint, switch 120 may remove or delete the LFI tag 370 of Ethernet frame 300. With the LFI tag 370 removed and the transient CFI field 335 restored with the legacy CFI value provided in the original CFI field 225, the Ethernet frame has been modified as Ethernet frame 400 in FIG. 7.

Ethernet frame 400 in FIG. 7 may include the same data and fields as Ethernet frame 200 shown in FIG. 4. In this manner, the data packet 100 included in Ethernet frame 200 and sent by the source endpoint, such as Host A in FIG. 3, may be more easily processed by a destination endpoint, such as Host B, that receives the data packet 100 included in Ethernet frame 400. Ethernet frames 200 and 400 may be indistinguishable by the source and destination endpoints.

At operation 660, a switch may drop the data packet 100 if both sending and destination ports included in the port comparison are identified as protected ports. For example, a data packet is transmitted by Host A connected to switch 110 in FIG. 3 to one of the destination endpoints connected to switch 130. Switch 130 includes two ports, protected port 135 and non-protected port 137. According to the example transmission protocol identified in table 500 of FIG. 4, a data packet transmitted from Host A to Host C would be dropped because the sending port identified as protected port 115 and the destination port identified as protected port 135, are both protected ports. On the other hand, a data packet transmitted from Host A to Host D would be forwarded because the destination port identified as non-protected port 131, is not a protected port. According to the transmission protocol identified in table 500 of FIG. 4, a data packet is forwarded to any destination port that is identified as being non-protected.

Table 500 in FIG. 4 may be provided as an algorithm or included in a database. For example, the database may be included in the CPU 50 shown in FIG. 3, or in some other processor or server. Data packets that are broadcast over the VLAN may be independently analyzed by more than one switch according to the same or different transmission protocols. Data included in Ethernet frame 200 and Ethernet frame 300 may be transmitted across the same VLAN. Switches in the VLAN are able to distinguish different types of Ethernet frames according to information stored in the original CFI field 235 or the transient CFI field 335. According to one embodiment, switches are able to provide a protected port, or private VLAN edge, feature for data packets included in Ethernet frame 300.

The LFI tag 370 includes fields which may be used to provide additional data or instructions for data transmission. Other types of layer-two features and transmission protocols may be implemented accordingly. VLANs and systems including more or fewer endpoints and switches than shown in FIG. 3 may implement the methods described herein, and the above examples are provided for illustrative purposes only.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A network processing apparatus for transmitting packets comprising: a processor configured to format the packets to include:
    a destination field identifying a destination endpoint;
    a source field identifying a source endpoint; and
    an information tag indicating a port status of the source endpoint for providing drop and forwarding information while the packets are transmitted between the source endpoint and the destination endpoint;
    a transient field identifying the information tag as being valid or invalid; and
    a legacy field in the information tag temporarily storing original data read from the transient field.

2. The apparatus according to claim 1 where the information tag is a layer-two feature information tag.

3. The apparatus according to claim 2 where the information tag is attached to a data field of an Ethernet frame.

4. The apparatus according to claim 1 including an Institute of Electrical and Electronic Engineers (IEEE) industry standard IEEE 802.1Q VLAN tag having a Canonical Format Indicator bit used as the transient field.

5. A system comprising:
   a source endpoint connected to a first access port;
   a destination endpoint connected to a second access port;
   a backplane interconnect; and
   two or more network processing devices indirectly connected through the backplane interconnect to transmit a data packet between the source and destination endpoints according to a protected port status of the first and second access ports, where the protected port status of the first access port is stored in a Layer-two Feature Information (LFI) tag of the data packet, and where data removed from a transient field of the data packet is stored in a legacy field of the LFI tag.

6. The system according to claim 5 including a backplane Ethernet switch interconnecting the two or more network processing devices without a stacked connection.

7. The system according to claim 5 where at least one of the two or more network processing devices include a different Application Specific Integrated Circuit (ASIC).

8. The system according to claim 5 where the LFI tag is transparent to the backplane interconnect.

9. The system according to claim 5 where the two or more network processing devices are attached as a stacked connection.

10. The system according to claim 9 where the two or more network processing devices include a common ASIC.

11. The system according to claim 5 where the protected port status is stored in a Canonical Format Indicator bit of the LFI tag.

12. A method for transmitting data over a network comprising:
    receiving a packet from a source data port, where the packet received by a network processing device includes an Ethernet frame;
    reading a transient field in the Ethernet frame to determine if a feature information tag is valid;
    reading the feature information tag in the Ethernet frame, where the feature information tag includes a port attribute of the source data port;
    comparing the port attribute with a destination data port to determine a port comparison;
    deciding whether to transmit or drop the packet according to the port comparison;
    reading a legacy value in the feature information tag; and
    modifying the transient field in the Ethernet frame to store the legacy value.

13. The method according to claim 12 including deleting the feature information tag and transmitting the packet to an endpoint.

14. The method according to claim 12 where the port attribute identifies a protected port status of a sending data port connecting a source endpoint to a Virtual Local Area Network (VLAN), and the destination data port connects a destination endpoint to the VLAN.

15. The method according to claim 14 including dropping the packet if both the sending and destination ports are identified as protected ports.

16. The method according to claim 12 including transmitting the packet, where the feature information tag is provided as a layer-two protocol information tag added to the Ethernet frame.

17. The method according to claim 12 where the transient field comprises a Canonical Format Indicator bit of the Ethernet frame.

18. The method according to claim 12 where the source data port is associated with a first device of the network, and where the destination data port is associated with a second device of the network.

19. A method comprising:
    receiving a packet from a data port, including an Ethernet frame;
    inserting a data link tag in the Ethernet frame, including a port attribute field;
    reading a transient field in the Ethernet frame to obtain a legacy value;
    writing the legacy value in the data link tag;
    modifying the transient field to indicate a data link tag status; and
    transmitting the packet from a network processing device to one or more other network processing devices.

20. The method according to claim 19 including independently interconnecting the network processing devices over a backplane switch.

21. The method according to claim 20 where the data link tag is transparent to the backplane switch.

22. The method according to claim 19 where the transient field is a Canonical Format Indicator (CFI) bit in an Institute of Electrical and Electronic Engineers (IEEE) standard 802.1Q VLAN tag included in the Ethernet frame.

23. The method according to claim 19 including:
    reading the port attribute field including a port attribute;
    comparing the port attribute with a destination data port to determine a port comparison; and
    deciding whether to transmit or drop the packet according to the port comparison.

24. Logic encoded in one or more tangible media that, if executed by a computing device, cause the computing device to:
    receive a data packet including a data frame;
    read a transient field in the data frame to determine if a feature information tag is valid;
    read the feature information tag in the data frame, including a port attribute;
    compare the port attribute with a destination data port to determine a port comparison;
    decide whether to transmit or drop the data packet according to the port comparison;
    read a legacy value in the feature information tag; and
    modify the transient field in the data frame to include the legacy value.

25. The tangible media according to claim 24 where the computing device is further configured to:
    delete the feature information tag; and
    transmit the data packet to an endpoint.

26. The tangible media according to claim 24 where the computing device is further configured to drop the data packet if the port attribute identifies a sending data port and the destination data port as both being protected.

27. The tangible media according to claim 24 where the transient field comprises a Canonical Format Indicator (CFI) bit.

28. The tangible medium according to claim 27 where the CFI bit is included in an Institute of Electrical and Electronic Engineers (IEEE) industry standard IEEE 802.1Q VLAN tag.

29. An apparatus comprising:
    means for receiving a packet from a data port, including an Ethernet frame;

means for inserting a data link tag in the Ethernet frame, including a port attribute field;

means for reading a transient field in the Ethernet frame to obtain a legacy value;

means for writing the legacy value in the data link tag;

means for modifying the transient field to indicate a data link tag status; and means for transmitting the packet to one or more network processing devices.

30. The apparatus according to claim 29 further comprising means for independently interconnecting the one or more network processing devices over a backplane switch.

31. The apparatus according to claim 29 where the transient field comprises a Canonical Format Indicator bit of the Ethernet frame.

32. A network processing apparatus comprising:
a processor configured to format a data packet to include:
a destination field identifying a destination endpoint;
a source field identifying a source endpoint;
an information tag indicating a port status of the source endpoint of the data packet;
a transient field identifying a status of the information tag, where the transient field is a Canonical Format Indicator (CFI) bit of the data packet; and a legacy field in the information tag storing original data removed from the transient field.

33. The apparatus according to claim 32 where the port status indicates that the source endpoint comprises a protected port or a non-protected port.

* * * * *

UNITED STATES PATENT AND TRADEMARK OFFICE
CERTIFICATE OF CORRECTION

PATENT NO.        : 7,710,959 B2                                          Page 1 of 1
APPLICATION NO.   : 11/468219
DATED             : May 4, 2010
INVENTOR(S)       : Kailasapathi Ramasamy It is certified that error appears in the above-identified patent and that said Letters Patent is hereby corrected as shown below:

On the Title page, column 2, item (56); OTHER PUBLICATIONS, delete "2707" and insert
-- 2702 --.

On column 8, line 54, CLAIM 1, after "comprising:" insert a line break.

On column 8, line 57, CLAIM 1, after "endpoint;" delete "and".

On column 10, line 62, CLAIM 28, after "tangible" delete "medium" and insert -- media --.

Signed and Sealed this
Twenty-fourth Day of April, 2012

David J. Kappos
*Director of the United States Patent and Trademark Office*